United States Patent [19] [11] 4,049,871
Ogawa et al. [45] Sept. 20, 1977

[54] MAGNETIC RECORDING MATERIAL

[75] Inventors: Hiroshi Ogawa; Yasuo Tamai, both of Odawara; Tutomu Nishina, Minami-ashigara, all of Japan

[73] Assignee: Fuji Photo Film Co., Ltd., Minami-ashigara, Japan

[21] Appl. No.: 679,287

[22] Filed: Apr. 22, 1976

Related U.S. Application Data

[63] Continuation of Ser. No. 498,671, Aug. 19, 1974, abandoned.

[30] Foreign Application Priority Data

Aug. 17, 1973  Japan .................. 48-92114

[51] Int. Cl.² ............................. H01F 10/02
[52] U.S. Cl. ......................... 428/425; 428/499; 428/900; 428/423
[58] Field of Search ..................... 427/127–132; 428/425, 499, 900; 252/62, 54

[56] References Cited

U.S. PATENT DOCUMENTS

| 2,871,209 | 1/1959 | Shelley | 260/850 X |
| 2,982,745 | 5/1961 | Gaynes | 260/21 |
| 3,470,021 | 9/1969 | Hendricx | 117/235 |
| 3,585,141 | 6/1971 | Ingersoll | 117/235 |
| 3,617,378 | 11/1971 | Beck | 117/235 X |
| 3,630,910 | 12/1971 | Akashi et al. | 117/235 X |
| 3,634,137 | 1/1972 | Akashi et al. | 117/235 |
| 3,649,541 | 3/1972 | Ingersoll | 117/235 |
| 3,681,137 | 8/1972 | Nagazono | 117/235 |
| 3,833,412 | 9/1974 | Akashi et al. | 117/235 X |
| 3,840,400 | 10/1974 | Yamada et al. | 117/235 |

Primary Examiner—Bernard D. Pianalto
Attorney, Agent, or Firm—Sughrue, Rothwell, Mion, Zinn and Macpeak

[57] ABSTRACT

A magnetic recording material comprising a substrate having a magnetic recording layer thereon which comprises a finely divided ferromagnetic material dispersed in a binder comprising a polyurethane resin, a modified alkyd resin and a polyisocyanate compound.

9 Claims, No Drawings

MAGNETIC RECORDING MATERIAL

This is a continuation of application Ser. No. 498,671, filed Aug. 19, 1974, and now abandoned.

BACKGROUND OF THE INVENTION

1. Field of the Invention

The present invention relates to magnetic recording materials and, in particular, to those utilizing a new binder composition which imparts to the recording material superior surface properties, improved abrasion resistance and improved adhesion between the recording layer and the substrate.

2. Description of the Prior Art

As the binder used in the magnetic recording layer, a variety of thermoplastic resins and thermosetting resins and mixtures thereof have been conventionally utilized.

As thermoplastic resins, those are used which have a softening point below about 150° C, an average molecular weight of from about 10,000 to 200,000, and a degree of polymerization of from about 200 to 1,000, including, e.g., copolymers of vinyl chloride and vinyl acetate, copolymers of vinyl chloride and vinylidene chloride, copolymers of vinyl chloride and acrylonitrile, copolymers of an acrylic ester and acrylonitrile, copolymers of an acrylic ester and vinylidene chloride, copolymers of an acrylic ester and styrene, copolymers of a methacrylic ester and acrylonitrile, copolymers of a methacrylic ester and vinylidene chloride, copolymers of a methacrylic ester and styrene, urethane elastomers, poly(vinyl fluoride), copolymers of vinylidene chloride and acrylonitrile, copolymers of butadiene and acrylonitrile, polyamide resins, polyvinyl butyral, cellulose derivatives (cellulose acetate butyrate, cellulose diacetate, cellulose triacetate, cellulose propionate, nitrocellulose, etc.), copolymers of styrene and butadiene, polyester resins, copolymers of chlorovinylether and an acrylic ester, amino resins, thermoplastic resins comprising various synthetic rubbers, and mixtures of the above cited resins.

The use of these resins is described in the following Japanese Patent Publications Nos. 6877/1962, 12528/1964, 19282/1964, 5349/1965, 20907/1965, 9463/1966, 14095/1966, 16985/1966, 6428/1967, 11621/1967, 4623/1968, 15206/1968, 2889/1969, 17947/1969, 14500/1969, 18573/1972, 22063/1972, 22064/1972, 22068/1972, 22069/1972, 22070/1972, 27886/1972, etc. and U.S. Patents 3,144,352, 3,419,420, 3,499,789, 3,713,887, etc.

Typical thermosetting resins are those which have a molecular weight of less than about 200,000 as a coating mixture and which form a three-dimensional network after coating and drying to give an infinitely large molecular weight structure as the result of condensation and/or addition reactions. Moreover those are preferably used which tend neither to soften nor melt until they begin to thermally decompose. Practical examples include, for example, phenol resins, epoxy resins, polyurethane curable resins, ureaformaldehyde resins, melamine-formaldehyde resins, alkyd resins, silicone resins, reactive acrylic resins, epoxy-polyamide resins, nitrocellulose-melamine resins, a mixture of a high molecular weight polyester resin and an isocyanate prepolymer, a mixture of a copolymer containing a salt of methacrylic acid and a di-isocyanate prepolymer, a mixture of a polyester-polyol and a poly-isocyanate, urea-formaldehyde resins, a mixture of a low molecular weight glycol, a high molecular weight diol and triphenylmethane tri-isocyanate, polyamide resins and mixtures thereof.

The use of these resins are described in, for example, the following Japanese Patent Publication Nos. 8103/1964, 9779/1965, 7192/1966, 8016/1966, 14275/1966, 28023/1967, 14501/1970, 24902/1970, 13103/1971, 22065/1972, 22066/1972, 22067/1972, 22072/1972, 22073/1972, 21045/1972, 28048/1972, 28922/1972, etc., and U.S. Patents 3,144,353, 3,320,090, 3,437,510, 3,597,273, 3,781,210, 3,781,211, etc.

When, however, any of these binder formulations was applied to a recording tape, especially to a video tape or an electronic computer tape, dropout tended to frequently occur due to the abrasive peel-off of the magnetic recording layer. Further, urethane containing binder formulations could not be used for video tapes because of their poor dispersion property and an inferior surface property.

In the past alkyd resins were usually cured by either a metal soap, a melamine-formaldehyde resin, etc. Such curing proceeded rather slowly and was often incomplete, and thus the mechanical strength of the tape was sufficient only after a prolonged period of storage following the manufacture. When such a tape was subjected to recording immediately after manufacture, the magnetic layer was easily worn off, causing recording head choking.

SUMMARY OF THE INVENTION

A principal object of the present invention is to improve the above-cited shortcomings.

One object of the present invention is to provide a new magnetic recording material.

A second object is to provide a magnetic recording material with an improved abrasion resistance.

A third object is to provide a magnetic recording material in which the ferromagnetic material is quite excellently dispersed.

A fourth object is to provide a magnetic recording material with a superior surface smoothness and uniformity.

These and other objects have been realized by the magnetic recording material of the present invention comprising a substrate and a magnetic recording layer thereon which comprises finely divided ferromagnetic material dispersed in a binder, which comprises a polyurethane resin, an alkyd resin and a polyisocyanate compound.

DETAILED DESCRIPTION OF THE INVENTION

The alkyd resins used in the present invention include those obtained by modifying the reaction product of polycarboxylic acids and polyvalent alcohols with suitable monovalent modifiers. Suitably the weight ratio of the polycarboxylic acid to the polyvalent alcohol ranges from about 2:10 to 10:2. Suitable examples of alkyd resins which can be used are described in U.S. Pat. Nos. 2,871,209 and 2,982,745 and German Pat. No. 1,045,652.

The polycarboxylic acids, e.g., a polycarboxylic acid having at least 2 carboxyl groups in the molecule, include aromatic polycarboxylic acids, their anhydrides and derivatives thereof such as phthalic anhydride, terephthalic acid, isopthalic acid, trimellitic acid, tetrachlorophthalic acid, hexahydrophthalic acid, endomethylenetetrahydrophthalic anhydride, hexachloro-endo-methylenephthalic anhydride, etc., aliphatic saturated polycarboxylic acids and their anhydrides such as succinic acid, adipic acid, sebacic acid, azelaic acid, etc. aliphatic unsaturated polycarboxylic acids such as maleic acid, maleic anhydride, fumaric acid, itaconic acid, citraconic anhydride, etc., and those polycarboxylic acids obtained by a Diels-Alder reaction such as cyclopentadiene-maleic anhydride adduct, terpene-maleic anhydride adduct, or rosin-maleic anhydride adduct.

The polyhydric alcohols, e.g., an aliphatic polyhydric alcohol having at least 2 hydroxy groups in the molecule and containing 2 to 15 carbon atoms preferably 2 to 9 carbon atoms, including diols such as ethylene glycol, diethylene glycol, triethylene glycol, propylene glycol, trimethylene glycol, tetramethylene glycol, etc., triols such as glycerol, trimethylolpropane, etc., and diglycerol, triglycerol, pentaerithritol, dipentaerithritol, manitol, sorbitol, etc.

Suitable modifiers include natural oils containing saturated fatty acids having 12 to 24 carbon atoms, unsaturated fatty acids having 12 to 24 carbon atoms and mixtures thereof and the glycerin esters of these fatty acids such as soya oil, linseed oil, tung oil, castor oil, dehydrated castor oil, coconut oil, safflower oil, sesame seed oil, fish oil, walnut oil, oiticica oil, cotton seed oil and fatty acids comprising these oils, saturated and unsaturated fatty acids such as stearic acid, oleic acid, linoleic acid, linolenic acid, eleostearic acid, ricinoleic acid, and dehydrated ricinoleic acid, natural resins such as rosin, copal, amber, shellac, etc., synthetic resins such as ester gum, phenol-formaldehyde resins, urea-formaldehyde resins, melamine-formaldehyde resins, silicone resins, etc., monomers such as styrene, acrylic acid, methyl methacrylate, methacrylic acid, etc. These modifiers can be used in combination, if desired.

The modified alkyd resins of this invention should preferably have an acid value not higher than about 15, and more preferably 0.1 to 10. Generally, these materials are liquids or semi-solids at about 25° C and have a molecular weight ranging from about 1,000 to 4,000. A representative composition for the modified alkyd resins is about 20 to 50% by weight polycarboxylic acid, about 10 to 30% by weight of polyhydric alcohols and about 20 to 60% by weight modifiers.

One can obtain the polyurethane resins for use in the present invention by first reacting an organic aromatic or saturated or unsaturated aliphatic dicarboxylic acid such as phthalic acid, adipic acid, linoleic acid dimer, maleic acid or dimeric acid either with a polyhydric alcohol such as a diol, e.g., ethylene glycol, propylene glycol, butylene glycol, diethylene glycol, etc., a triol, e.g., trimethylolpropane, hexane triol, glycerol, trimethyloethane, etc., or a polyol, e.g., pentaerithritol, etc. to form a polyester polyol, or with one or more compounds selected from the group consisting of an alkylene oxide, e.g., polyethylene oxide, polypropylene oxide, polybutylene oxide, etc., a triol, e.g., glycerol, trimethylolpropane, hexanetriol, trimethylolethane, etc., a polyol, e.g., pentaerithritol, sorbitol, etc., tetrahydrofuran, a diamine, e.g., ethylene diamine, etc., a polyol amine, e.g., triethanol amine, etc., a thiol alcohol, e.g., thioglycol, etc. to form a polyether polyol, and then further treating this polyester polyol or polyether polyol with a di-isocyanate compound such as tolylene di-isocyanate, 4,4'-diphenylmethane di-isocyanate, hexamethylene di-isocyanate, meta-xylylene di-isocyanate, 3,3'-bitolylene-4,4'-di-isocyanate, 3,3'-dimethyldiphenylmethane-4,4'-di-isocyanate, 2,4-tolylene di-isocyanate dimer, 1,5-naphthylene di-isocyanate, meta-phenylene di-isocyanate, etc. to form a polyester polyurethane or polyether polyurethane resin. A suitable molecular weight range for the polyester polyol and the polyether polyol is about 500 to 3,000 and for the polyester polyurethane and the polyether polyurethane is about 10,000 to 100,000. Suitable examples of these materials and methods of their preparation are disclosed in U.S. Pat. Nos. 2,878,236, 2,933,477 and 2,933,478.

The polyisocyanate compounds used in the present invention are those having at least two isocyanate groups and the adducts derived therefrom, including an aliphatic di-isocyanate, an aliphatic di-isocyanate containing a cycloalkyl radical, an aromatic isocyanate, a napthalene isocyanate, a biphenyl isocyanate, a diphenylmethane di-isocyanate, a triphenylmethane di-isocyanate, a triphenylmethane triisocyanate, a triphenylmethane tetra-isocyanate, and the adducts thereof.

Examples of specific compounds are di-isocyanates such as ethane di-isocyanate, butane di-isocyanate, hexane di-isocyanate, 2,2-dimethylpentane di-isocyanate, 2,2,4-trimethylpentane di-isocyanate, decane di-isocyanate, $\omega$, $\omega'$-di-isocyanate-1,3-dimethylbenzol, $\omega$, $\omega'$-di-isocyanate-1,2-dimethylcyclohexane di-isocyanate, $\omega$, $\omega'$-di-isocyanate-1,4-diethylbenzol, $\omega$, $\omega'$-di-isocyanate-1,5-dimethylnapthalene, $\omega$, $\omega'$-di-isocyanate-n-propyl-biphenyl, 1,3-phenylene di-isocyanate, 1-methylbenzol-2,4-di-isocyanate, 1,3-dimethylbenzol-2,6-di-isocyanate, naphthalene-1,4-di-isocyanate, 1,1'-dinaphthyl-2,2'-di-isocyanate, 1,1'-dinaphthyl-2,2'-di-isocyanate, biphenyl-2,4'-di-isocyanate, tolylene di-isocyanate, 1,5-naphthylene di-isocyanate, 3,3'-dimethylbiphenyl-4,4'-di-isocyanate, diphenylmethane-4,4'-di-isocyanate, 2,2'-dimethyldiphenylmethane-4,4'-di-isocyanate, 3,3'-dimethoxydiphenylmethane-4,4'-di-isocyanate, 4,4'-di-ethoxydiphenylmethane-4,4'-di-isocyanate, etc., tri-isocyanates such as 1-methylbenzol-2,4,6-tri-isocyanate, 1,3,5-trimethylbenzol-2,4,6-triisocyanate, diphenylmethane-2,4,4'-tri-isocyanate, triphenylmethane-4, 4', 4''-tri-isocyanate, etc., adducts containing the dimer or trimer of an isocyanate compound cited above; and adducts of any of these isocyanates with a polyol containing two or three hydroxyl groups. Suitable adducts include those of tolylene di-isocyanate with trimethylolpropane, of 3 moles of tolylene di-isocyanate, of 3 moles of hexamethylene di-isocyanate, and of 2 moles of hexamethylene di-isocyanate. Further, those selected from the above cited various isocyanates are included.

A suitable range of the mixing ratio of the alkyd resin (A), the polyurethane (B) and the polyisocyanate (C) by weight is as follows;

A/B = about 90:10 to 10:90, and (A + B)/C = about 95:5 to 60:40, and more preferably, A/B = 70:30 to 30:70 and (A + B)/C = 90:10 to 70:30.

The magnetic recording material of the present invention can be produced by coating on a substrate a magnetic coating mixture comprising any of these binders and a finely-divided ferromagnetic material dispersed therein. A suitable coating amount is a thickness of about 0.5 to 10 microns on a dry basis.

Detailed descriptions of the production of the magnetic coating mixture, can be found, for example in the following Japanese Patent Publications Nos. 28043/1972, 186/1968, 28045/1972, 28046/1972, 28048/1972, 31445/1972, etc. and U.S. Pat. Nos. 3,597,273, 3,630,771, 3,634,137, 3,634,185 and 3,650,828. The magnetic coating mixtures described in these specifications generally comprise mainly a ferromagnetic powder, a binder, and a coating solvent, and further can contain, as minor ingredients, a dispersing agent, a lubricant, and an abrasive material.

The ferromagnetic materials used in the present invention include $\gamma\text{-}Fe_2O_3$, $\gamma\text{-}Fe_2O_3$ containing Co, $Fe_3O_4$, $Fe_3O_4$ containing Co, $CrO_2$, Co-Ni-P alloy, Co-Ni-Fe alloy, Co-B alloy, Co-P alloy, Fe-Co alloy, Fe-Co-Cr alloy, and other conventionally known powders. A suitable average particle size ranges from about 0.02 to 5 microns, preferably 0.1 to 1.5 microns. More detailed descriptions can be found in the following Japanese Patent Publications Nos. 14090/1969, 18372/1970, 22062/1972, 22513/1972, 28466/1971, 38755/1971, 4286/1972, 12422/1972, 17284/1972, 18509/1972, 18573/1972, U.S. Pat. Nos. 3,026,215, 3,031,341, 3,100,194, 3,242,005 and 3,389,014, British Pat. Nos. 752,659, 782,762 and 1,007,323, French Pat. No. 1,107,654, German Patent Application (Laid Open to Public Inspection) No. OLS 1,281,334, etc.

It has been proved that the binder formulations of the present invention are especially advantageous when used with ferromagnetic alloy powders although, they can be, of course, advantageously utilized for various ferromagnetic oxide powders. In general, metal alloy powders cannot be readily dispersed in binders so that it is quite difficult to produce a magnetic tape having a high degree of surface smoothness. This difficulty has been eliminated using the binder formulations of the present invention. This advantage is perhaps attributed to a strong affinity between the binder molecules, especially those of the alkyd resin and the metal powder.

Other ingredients can be added to the magnetic recording layer of the present invention. The preferred range of the mixing ratio between the ferromagnetic material and the binder ranges from about 100:10 to 100:200, by weight.

Typical additional ingredients include dispersing agents, lubricants, abrasives, etc.

Suitable dispersing agents include an aliphatic monocarboxylic acid containing about 12 to 18 carbon atoms (represented by $R_1COOH$ wherein $R_1$ is an alkyl group containing 11 to 17 carbon atoms) such as caprylic acid, capric acid, lauric acid, myristic acid, palmitic acid, stearic acid, oleic acid, elaidic acid, linoleic acid, linolenic acid, and stearolic acid; an aliphatic monocarboxylic acid ester (represented by $R_2COOR_3$ wherein $R_2$ and $R_3$ each represents an alkyl group containing about 1 to 12 carbon atoms) such as ethyl caprylate, propyl laurate, etc; a metal soap selected from the alkali metal (e.g., sodium, polassium, etc.) or alkaline earth metal (e.g., magnesium, calcium, etc.) soaps of the above described aliphatic monocarboxylic acids, and lecithin. Further, a higher aliphatic monohydric alcohol containing more than about 12 carbon atoms up to about 20 carbon atoms such as lauryl alcohol, cetyl alcohol, stearyl alcohol, etc. and the sulfuric acid ester thereof can also be used. The dispersing agent can be added in an amount of from about 0.2 to 20 parts by weight preferably 1 to 20 parts by weight, per 100 parts by weight of the binder.

Suitable lubricants include silicone oil, graphite, molybdenum disulfide, tungsten disulfide, an aliphatic acid ester comprising a aliphatic monocarboxylic acid containing about 12 to 16 carbon atoms and a monohydric alcohol containing about 3 to 12 carbon atoms, and an aliphatic acid ester comprising a monocarboxylic acid having not less than about 17 carbon atoms and a monohydric alcohol such that the total number of carbon atoms in the ester amounts to about 15 to 28. The lubricant is added in an amount of from about 0.2 to 20 parts by weight, preferably 1 to 10 parts by weight, per 100 parts by weight of the binder. Descriptions as for the use of lubricants can be found in Japanese Patent Publication No. 23889/1968, U.S. Patent Nos. 3,470,021, 3,492,235, 3,497,411, 3,523,086, 3,625,760, 3,630,772, 3,634,253, 3,647,539 and 3,687,725, *IBM Technical Disclosure Bulletin* Vol. 9, No. 7, page 779, December 1966, and *ELEKTRONIC* 1961, No. 12, page 380.

Suitable abrasives include those usually used such as fused alumina, silicon carbide, chromium dioxide, corundum, synthetic corundum, diamond, synthetic diamond, garnet, emery (mainly comprising corundum and magnetite), etc. These materials should preferably have a particle diameter of from about 0.05 to 5 microns and more preferably of from 0.1 to 2 microns, and they are added to the formulation at about 1 to 20 parts by weight, preferably 7 to 15 parts by weight, per 100 parts by weight of the binder, as is described in for example, Japanese Patent Application No. 26749/1973 and U.S. Pat. Nos. 3,007,802, 3,041,196, 3,293,066, 3,630,910 and 3,687,725, British Pat. No. 1,145,349, and German Pat. No. 853,211.

Organic solvents used as a coating solvent include ketones such as acetone, methyl ethyl ketone, methyl isobutyl ketone, cyclohexanone, etc., alcohols such as methanol, ethanol, propanol, butanol, etc., esters such as methyl acetate, ethyl acetate, butyl acetate, ethyl lactate, glycol acetate monoethyl ether, etc., ethers or glycol ethers such as diethyl ether, glycoldimethylether, glycol monoethyl ether, dioxane, etc., aromatic hydrocarbons such as benzene, toluene, xylene, etc., and chlorinated hydrocarbons such as methylene chloride, ethylene chloride, carbon tetrachloride, chloroform, ethylene chlorohydrin, dichlorobenzene, etc. A suitable amount of solvent to the materials contained in the coating composition ranges from about 4:1 to 1:1 by weight.

Suitable supports which can be used include polyesters such as polyethylene terephthalate, polyethylene-2,6-naphthalate, polybutylene terephthalate, etc., polyolefins such as polypropylene, etc., cellulose derivatives such as cellulose triacetate, cellulose diacetate, etc., vinyl resins such as polyvinyl chloride, etc., polycarbonate, etc., metals such as aluminum, copper, etc., ceramics such as glass, earthenware, porcelain, etc.

The heretofore described magnetic recording materials prepared in accordance with the present invention contain the magnetic fine powder in a well dispersed and well oriented state by the effect of a magnetic field, have an improved lubricating as well as an improved abrasion resistant property, and further have a surface hardness which imparts an improved solvent resistance to the material.

The present invention will now be explained by reference to some preferred specific examples and comparative examples. It is self-evident that the ratios or the order of procedures can be modified arbitrarily within the scope of the invention. These examples are shown for the purposes of illustration and are not to be construed as limiting the scope of the invention. In the following examples, all parts and percents are by weight unless otherwise indicated.

EXAMPLE I

The following ingredients,

| | Parts |
|---|---|
| Finely Divided Co-Fe (3:7 weight ratio) Alloy (average diameter of 250 A) | 300 |
| Polyester-Polyurethane Resin* | 30 |
| Safflower Oil Modified Alkyd Resin (oil length of 60 mol %) | 35 |
| Silicone Oil (polydimethylsiloxane) (molecular weight about 1,000) | 2 |
| Butyl Acetate | 250 |
| Methyl Ethyl Ketone | 450 |

*Reaction product of polyester comprising adipic acid as acid component and diethylene glycol and butanediol as glycol component with diphenylmethane diisocyanate, the reaction product having a molecular weight of about 30,000.

were thoroughly blended in a ball mill for about 20 hours, then with the addition of 22 parts of a tri-isocyanate compound ("Desmodur L-75" trade name produced by Bayer AG, adduct of 3 mols of toluenediisocyanate and 1 mol of trimethylolpropane) further blended in a high-speed shear blender for 1 hour. The resulting magnetic coating mixture was coated on a 25 micron thick poly(ethylene terephthalate) film with the application of a magnetic field to give a dried coating thickness of 3 microns. The coated film was dried under heating. The resulting magnetic tape was then subjected to a super-calendering treatment, followed by slitting to a ½ inch width to give a video tape designated Sample Number No. 1.

EXAMPLE II

The safflower oil modified alkyd resin in Example I was replaced in the same amount by a castor oil modified alkyd resin with an oil length of 50 mol%. The other ingredients and the manufacturing operations were the same as those of Example I. The resulting video tape was designated as Sample Number No. 2.

EXAMPLE III

| | Parts |
|---|---|
| γ $Fe_2O_3$ Powder (average size 0.8 × 0.1 × 0.1 micron) | 300 |
| Polyester-Polyurethane Resin * | 30 |
| Safflower Oil Modified Alkyd Resin (oil length of 60 mol %) | 30 |
| Silicone Oil* | 2 |
| Electrically Conductive Carbon Black (average particle size about 18 μ) | 15 |
| Butyl Acetate | 250 |
| Methyl Ethyl Ketone | 450 |

*As described in Example I

The above ingredients were blended thoroughly in a ball mill for about 20 hours, after which 20 parts of a tri-isocyanate compound ("Desmodur L-75" trade name produced by Bayer AG.) was added and blending for an additional 1 hour was carried out with a high-speed shear blender. The resulting magnetic coating mixture was coated on a 25 micron thick poly(ethylene terephthalate) film under application of a magnetic field to give a dried thickness of 5 microns. After drying and supercalendering, the film was slit into a ½ inch width to give a video tape. This sample was designated Sample Number No. 3.

EXAMPLE IV

The procedures in Example III were precisely repeated only with the replacement of the safflower oil modified alkyd resin having a 60 mol% oil length with a coconut oil modified alkyd resin with a 50 mol% oil length. This sample was designated Sample Number No. 4.

EXAMPLE V

The procedures in Example III were precisely repeated only with the replacement of the safflower oil modified alkyd resin having a 60 mol% oil length with an acrylate modified alkyd resin with an acrylate content of 20% by weight. The video tape thus obtained was designated Sample Number No. 5.

Example VI

| | Parts |
|---|---|
| Chromium Dioxide (particle size about 0.4 μ × 0.01 μ) | 300 |
| Polyether-Polyurethane Resin* | 25 |
| Safflower Oil Modified Alkyd Resin (oil length of 60 mol %) | 25 |
| Silicone Oil** | 1.5 |
| Butyl Acetate | 250 |
| Methyl Ethyl Ketone | 350 |

*Polyethylene oxide/polypropylene oxide copolymer (mol. wt. about 3,000) reaction product with diphenylmethane diisocyanate, the polyether - polyurethane resin having a molecular weight of about 30,000.
**Same as described in Example 1

After blending of the above ingredients for about 20 hours in a ball mill, 15 parts of a tri-isocyanate compound ("Desmodur HL", reaction product of 3 moles of trimethylolpropane and 2 moles of hexamethylene diisocyanate trade name produced by Bayer AG.) was added to the mixture, which was then further blended for 1 hour in a high-speed shear blender. The magnetic coating mixture thus obtained was coated on a 25 micron thick poly(ethylene terephthalate) film under application of a magnetic field to give a dried thickness or 4 microns. After drying, the film was slit into a ½ inch width to give a video tape, which was designated Sample Number No. 6.

COMPARATIVE EXAMPLES

For the purpose of comparison, the safflower oil modified alkyd resin having an oil length of 60 mol% in Example I was replaced by 30 parts of a vinyl chloride/vinyl acetate (87:13) by weight) copolymer having a degree of polymerization of 300. The same procedures of Example I were repeated. The video tape thus obtained was designated Sample A.

Another sample of video tape designated Sample B was obtained using the procedures of Example III except that the safflower oil modified alkyd resin having an oil length of 60 mol% was replaced by 30 parts of a vinyl chloride/vinyl acetate copolymer (87:13 by weight) having a degree of polymerization of 300.

Still another sample of video tape designated Sample C was prepared following the procedures of Example VI only replacing the safflower oil modified alkyd resin having an oil length of 60 mol% with 30 parts of a vinyl chloride/vinyl acetate copolymer (87:13 by weight) having a degree of polymerization of 300.

Further, another sample of video tape designated Sample D was obtained using the procedures described in Example V except that the tri-isocyanate compound was replaced by 15 parts of a melamine-formaldehyde resin (molecular weight about 220).

The results of measurements on each of the video tapes obtained in the examples and the comparative examples are shown in the following Table I. The methods of measurement are described below the table.

Table I

| Sample No. | Br/Bm (a) | Surface Smoothness (b) | Abrasion Resistance (c) | Adhesion of Foreign Matter onto Recording Head (d) | 4 MHz Output (dB) (e) |
|---|---|---|---|---|---|
| #1 | 0.86 | Excellent | Excellent | None | +8.7 (+4.4 relat. to A) |
| #2 | 0.85 | Excellent | Excellent | None | +8.5 (+4.2 ") |
| #3 | 0.76 | Excellent | Excellent | None | +0.0 (+3.2 relat. to B) |
| #4 | 0.77 | Excellent | Excellent | None | +0.3 (+3.5 ") |
| #5 | 0.90 | Excellent | Excellent | None | +5.1 (+3.7 relat. to C) |
| #6 | 0.90 | Excellent | Excellent | None | +5.0 (+3.6 ") |
| A | 0.74 | Poor | Poor | Slight | +4.3 |
| B | 0.61 | Poor | Good | Slight | −3.2 |
| C | 0.83 | Poor | Good | Slight | +1.4 |
| D | 0.87 | Good | Very poor | Fair | impossible to measure due to head jamming |

(a) Along the direction of field orientation, with an external magnetic field of 2,000 oe for #1, #2 and A, 1,000 oe for the others.
(b) Observation with the naked eye and measurement at a 60° mirror reflection.
(c) Observation with the naked eye and a microscope of the tape surface after a tape of 50 meter length was repeatedly reciprocally scraped against an imitation head at a speed of 50 m/sec.
(d) Judged from the degree of soiling of a glaze with which the imitation head was cleaned, using ligroin, gauze 50 cycles of scraping.
(e) Values at recording without bias, normalized to the output of #3. These measurements were carried out about one week after the coating. These results demonstrate that the binder formulations of the present invention are, although effective for all kinds of ferromagnetic powders, especially effective for finely divided metal alloy ferromagnetic materials.

Thus by using the new binder formulations of the present invention, magnetic tapes having an improved surface smoothness as well as an improved abrasion resistance can be prepared which have been impossible to prepare with conventional formulations. By these improvements, the video sensitivity has been markedly increased and also the head soiling has reduced to a great extent.

While the invention has been described in detail and with reference to specific embodiments thereof, it will be apparent to one skilled in the art that various changes and modifications can be made therein without departing from the spirit and scope thereof.

What is claimed is:

1. A magnetic material comprising a non-magnetic substrate having a magnetic recording layer thereon which comprises a finely divided ferromagnetic material dispersed in a binder, said binder comprising:
   1. a polyurethane resin which comprises a polyester-polyurethane resin;
   2. a modified alkyd resin having an acid value of not higher than about 15, consisting of about 20 to 50% by weight polycarboxylic acid, about 10 to 30% by weight polyhydric alcohol, and about 20 to 60% by weight modifiers, said modifiers being natural oils selected from the group consisting of soya oil, linseed oil, tung oil, castor oil, dehydrated castor oil, coconut oil, safflower oil, sesame seed oil, fish oil, walnut oil, oiticica oil or cotton seed oil;
   3. and a polyisocyanate compound, said ferromagnetic powder being employed in a weight ratio of 100:10 to 100:200 to said binder; said alkyd resin, said polyurethane resin and said polyisocyanate compound being employed in weight ratios of about 90:10 to 10:90 for said alkyd resin to said polyurethane resin, and about 95:5 to 60:40 for the sum of the weight of said alkyd resin and said polyurethane resin to said polyisocyanate compound.

2. The magnetic recording material as claimed in claim 1, wherein said ferromagnetic powder is composed of at least one ferromagnetic metal alloy selected from the group consisting of a Co-Ni-P alloy, a Co-Ni-Fe alloy, a Co-B alloy, a Co-P alloy, a Fe-Co alloy and a Fe-Co-Cr alloy.

3. The magnetic recording material as claimed in claim 1, therein said ferromagnetic powder is composed of at least one of the materials selected from the group consisting of $\gamma$-$Fe_2O_3$, $\gamma$-$Fe_2O_3$ containing Co, $Fe_3O_4$, $Fe_3O_4$ containing Co, and $CrO_2$.

4. The magnetic recording material as claimed in claim 1, wherein the polyisocyanate is an adduct of an isocyanate compound having at least two isocyanate groups.

5. The magnetic recording material as claimed in claim 1, wherein said magnetic recording layer includes a dispersing agent in an amount of about 0.2 to 20 parts by weight based on 100 parts by weight of said binder.

6. The magnetic recording material as claimed in claim 1, wherein said alkyd resin has an acid value of not higher than about 1.

7. The magnetic recording material as claimed in claim 1, wherein said magnetic recording layer includes a lubricant in an amount of about 0.2 to 20 parts by weight based on 100 parts by weight of said binder.

8. The magnetic recording material as claimed in claim 1, wherein said magnetic recording layer includes a lubricant in an amount of about 1 to 20 parts by weight based on 100 parts by weight of said binder.

9. The magnetic recording medium as claimed in claim 1, wherein said modified alkyd resin has a molecular weight of from about 1,000 to 4,000.

* * * * *